(12) United States Patent
Akhtar et al.

(10) Patent No.: US 10,952,226 B1
(45) Date of Patent: Mar. 16, 2021

(54) SYSTEMS AND METHODS FOR CONCURRENT TRANSMISSION BY MULTIPLE WIRELESS DEVICES

(71) Applicant: Arista Networks, Inc., Santa Clara, CA (US)

(72) Inventors: Nadeem Akhtar, Mumbai (IN); Jatin Parekh, Mumbai (IN)

(73) Assignee: Arista Networks, Inc., Santa Clara, CA (US)

( * ) Notice: Subject to any disclaimer, the term of this patent is extended or adjusted under 35 U.S.C. 154(b) by 21 days.

(21) Appl. No.: 16/655,011

(22) Filed: Oct. 16, 2019

(51) Int. Cl.
| | | |
|---|---|---|
| *H04W 16/14* | (2009.01) | |
| *H04W 28/06* | (2009.01) | |
| *H04W 74/08* | (2009.01) | |
| *H04W 84/12* | (2009.01) | |
| *H04W 24/02* | (2009.01) | |
| *H04W 72/12* | (2009.01) | |
| *H04W 8/00* | (2009.01) | |
| *H04W 52/22* | (2009.01) | |

(52) U.S. Cl.
CPC ....... *H04W 72/1215* (2013.01); *H04W 8/005* (2013.01); *H04W 16/14* (2013.01); *H04W 28/06* (2013.01); *H04W 72/121* (2013.01); *H04W 74/0808* (2013.01)

(58) Field of Classification Search
CPC ......... H04W 72/1215; H04W 74/0808; H04W 16/14; H04W 72/121; H04W 8/005; H04W 28/06; H04W 72/082; H04W 72/085; H04W 72/087; H04W 84/12; H04W 16/10; H04W 24/02; H04W 52/146; H04W 52/20; H04W 52/228; H04W 52/241; H04W 52/243; H04W 52/244; H04W 52/245; H04W 52/44; H04W 52/50; H04B 17/30; H04B 17/309; H04B 17/318; H04B 17/327; H04B 17/336; H04B 17/345
See application file for complete search history.

(56) References Cited

U.S. PATENT DOCUMENTS

| | | | | |
|---|---|---|---|---|
| 10,206,246 | B2 * | 2/2019 | Huang | H04L 61/6004 |
| 10,356,624 | B2 * | 7/2019 | Cariou | H04W 16/10 |
| 10,555,265 | B2 * | 2/2020 | Shinohara | H04W 72/08 |
| 10,798,740 | B2 * | 10/2020 | Lanante | H04W 74/006 |
| 2019/0268892 | A1 * | 8/2019 | Gidvani | H04B 7/0413 |
| 2020/0045637 | A1 * | 2/2020 | Noh | H04W 52/0245 |

* cited by examiner

*Primary Examiner* — Ahmed Elallam
(74) *Attorney, Agent, or Firm* — Fountainhead Law Group P.C.

(57) ABSTRACT

Embodiments of the present disclosure include a systems and methods for concurrent wireless transmission. In one embodiment the present disclosure includes a wireless transmission method. A first wireless device may determine that a first wireless transmission using a first protocol between a plurality of wireless devices is not intended for processing by the first wireless device. The first wireless device may determine if a first power level of the first wireless transmission is below a threshold. The first wireless device may perform a second wireless transmission using a second protocol between the first wireless device and at least a second wireless device during the first wireless transmission when the first power level is below the threshold. A second power level of the second wireless transmission may be set to a first value determined based on the threshold. In other embodiments, techniques for sending packets concurrently are disclosed.

19 Claims, 6 Drawing Sheets

SYSTEMS AND METHODS FOR CONCURRENT TRANSMISSION BY MULTIPLE WIRELESS DEVICES

BACKGROUND

The present disclosure relates generally to wireless communications, and in particular, to systems and methods for concurrent transmission by multiple wireless devices.

Wireless access points are wireless communication devices that allow other wireless enabled devices (e.g., cell phones, laptop computers, or tablet computers) to connect to a wired communication network. Wireless access points are typically designed to support wireless communications using one or more particular protocols, such as one or more 802.11 protocols (e.g., 802.11b/g/a/n/ac). With the rapid growth of wireless networking, the prevalence and density of wireless access points continues to increase. When wireless access points are placed in close proximity to each other, transmissions from one device may interfere with transmissions from another device. Typically, when two devices in close proximity are performing transmissions, the devices may listen on a particular channel to make sure the channel is clear. If one wireless access point is transmitting on the channel, the other wireless access point may wait for the transmission to end before performing its own transmission.

One particular wireless communication protocol, 802.11ax, allows two wireless access points to transmit at the same time on the same channel under certain conditions. However, if one wireless access point is transmitting using the 802.11ax protocol and the other wireless access point is a legacy system that is unable to implement the 802.11ax protocol, concurrent transmission may not be performed.

More generally, techniques for performing and optimizing concurrent wireless transmissions would be advantageous to increase data throughput of a network, especially in networks operating in overlapping regions with mixed protocol wireless devices, for example.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions.

DETAILED DESCRIPTION

Described herein are techniques for concurrent transmission in a wireless system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Figure 1:
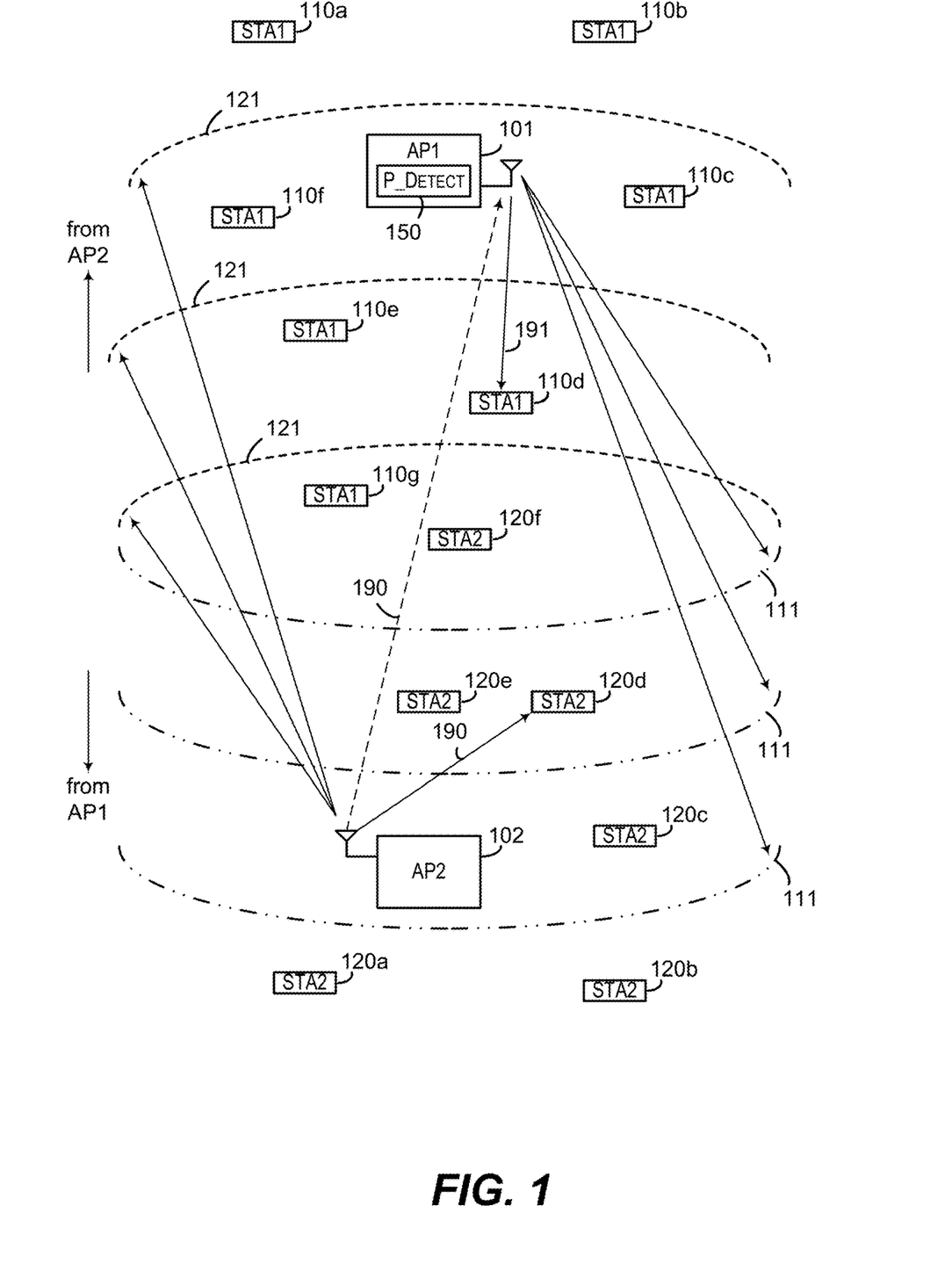
FIG. 1 illustrates concurrent wireless transmission according to an embodiment.

FIG. 1 illustrates concurrent wireless transmission according to an embodiment. Features and advantages of the present disclosure include techniques for allowing different wireless devices, which may be using different wireless protocols, for example, to transmit and receive data simultaneously. In this example, two wireless access points 101 (AP1) and 102 (AP2) are shown, although it is to be understood that the techniques disclosed herein may be employed by other types of wireless devices. AP1 101 may communicate wirelessly with wireless devices 110*a-g*, and AP2 102 may communicate wirelessly with wireless devices 120*a-f*, for example. Wireless devices 110*a-g* and 120*a-f* are sometimes referred to as stations ("STA"), and may include laptop computers, mobile phones, tablet computers, or other wireless enabled devices, for example. In one embodiment, AP1 101 and STAs 110*a-g* may communicate wirelessly using a first wireless protocol and AP2 102 and STAs 120*a-f* may communicate wirelessly using a second wireless protocol. In various embodiments, AP1 101 and AP2 102 may be positioned in sufficiently close proximity such that transmitted signal from one set of devices may be received by the other set of devices. For instance, a wireless transmission 111 from AP1 101 may propagate into a space occupied by AP2 102 and/or AP2's associated STAs 120*a-f*, for example. Similarly, a wireless transmission 121 from AP2 102 may propagate into a space occupied by AP1 101 and/or AP1's associated STAs 110*a-g*. Embodiments of the present disclosure allow AP1 101 to transmit to one or more STAs 110*a-g* concurrently during a transmission by AP2 102 without interfering with AP2's transmission to one or more STAs 120*a-f* when AP1 and AP2 (and/or their stations) are in close proximity such that their signals may overlap. Specifically, two transmissions may occur on the same/overlapping set of radio frequencies, for example.

For example, AP2 102 may perform a first wireless transmission 190 to STA2 120*d*. The first wireless transmission 190 may use a first wireless protocol, such as an 802.11 protocol, for example. However, the first wireless transmission 190 may propagate into a region occupied by AP1 101 and/or one or more STAs 110*a-g*. In order to avoid interfering with AP2's communication with STA2, AP1 may simply wait until wireless transmission 190 has ended, and the channel is clear, before initiating a wireless transmission to one of its STAs. However, as described herein, AP1 101 may advantageously perform a wireless transmission during the first wireless transmission 190, which increases data throughput of the system, for example. AP1 101 may determine that the first wireless transmission 190 is not intended for processing by AP1 101. Additionally, AP1 101 may determine if the received power level, P1, of the first wireless transmission 190 is below a threshold. For example, AP1 101 may include a power detector ("P_Detect") 150, for example. Based on these determinations, AP1 101 may perform a second wireless transmission 191 using a second wireless protocol (e.g., a different 802.11 protocol, such as 802.11ax) between AP1 101 and at least one STA (e.g., here, STA1 110d). Advantageously, the second wireless transmission 191 may be performed during the first wireless transmission 190 when the power level of the first wireless transmission 190 is below the threshold. AP1 101 may set a second transmit power level, P2, of the second wireless transmission 191 to a first value determined based on the threshold. The transmit power of AP1 101, P2, may be set high enough such that STA1 110d is able to receive and process the second wireless transmission 191 in the presence of the first wireless transmission 190 and low enough such that the second wireless transmission 191 does not interfere with the first wireless transmission 190 between AP2 102 and STA2 120d, for example.

Figure 2:
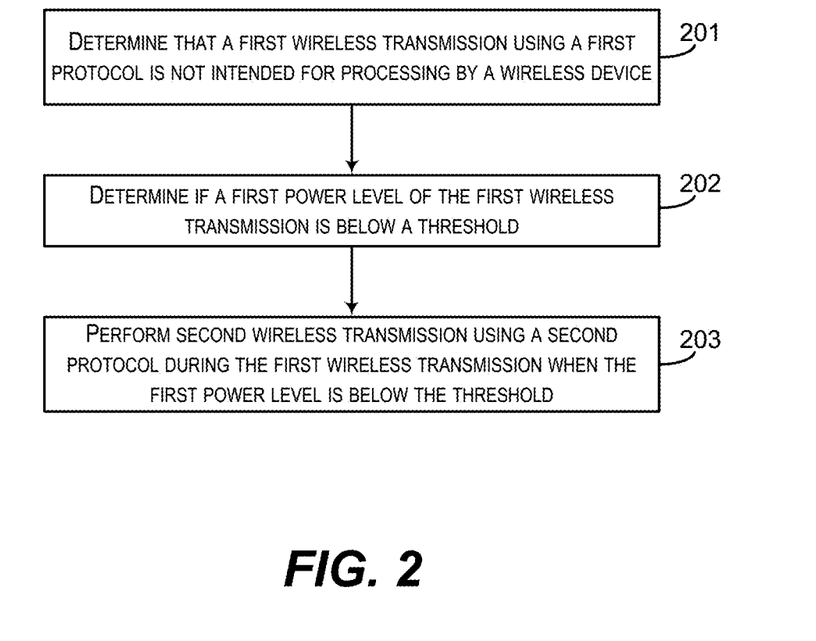
FIG. 2 illustrates a wireless transmission method according to an embodiment.

FIG. 2 illustrates a wireless transmission method according to an embodiment. At 201, a first wireless device determines that a first wireless transmission using a first protocol between a plurality of wireless devices is not intended for processing by the first wireless device. The first wireless device may be an access point, and the first protocol may be an 802.11 protocol, such as 802.11b, 802.11g, 802.11a, 802.11n, or 802.11ac, for example. At 202, the first wireless device may determine if a first power level of the first wireless transmission is below a threshold. At 203, the first wireless device performs a second wireless transmission using a second protocol between the first wireless device and at least a second wireless device (e.g, one or more STAs) during the first wireless transmission when the first power level is below the threshold. The second wireless transmission may use a different protocol than the first wireless transmission, such as 802.11ax, for example. For some example deployments of 802.11ax, legacy 802.11 systems such as 802.11b, 802.11g, 802.11a, 802.11n, or 802.11ac may be in overlapping regions. Such legacy systems may not have the ability to perform concurrent transmissions. Advantageously, embodiments described herein, including embodiments where the first wireless device uses the 801.11ax protocol, for example, may detect a legacy transmission and adjust the transmit power level so that concurrent transmission may successfully occur. A second power level of the second wireless transmission may be set to a first value determined based on the threshold. In particular, if a concurrent transmission occurs when the first power level of the first wireless transmission is below a particular power threshold value, a transmit power level of the second wireless transmission may be set so that the second wireless transmission may be successful without interfering with the first wireless transmission.

Figure 3:
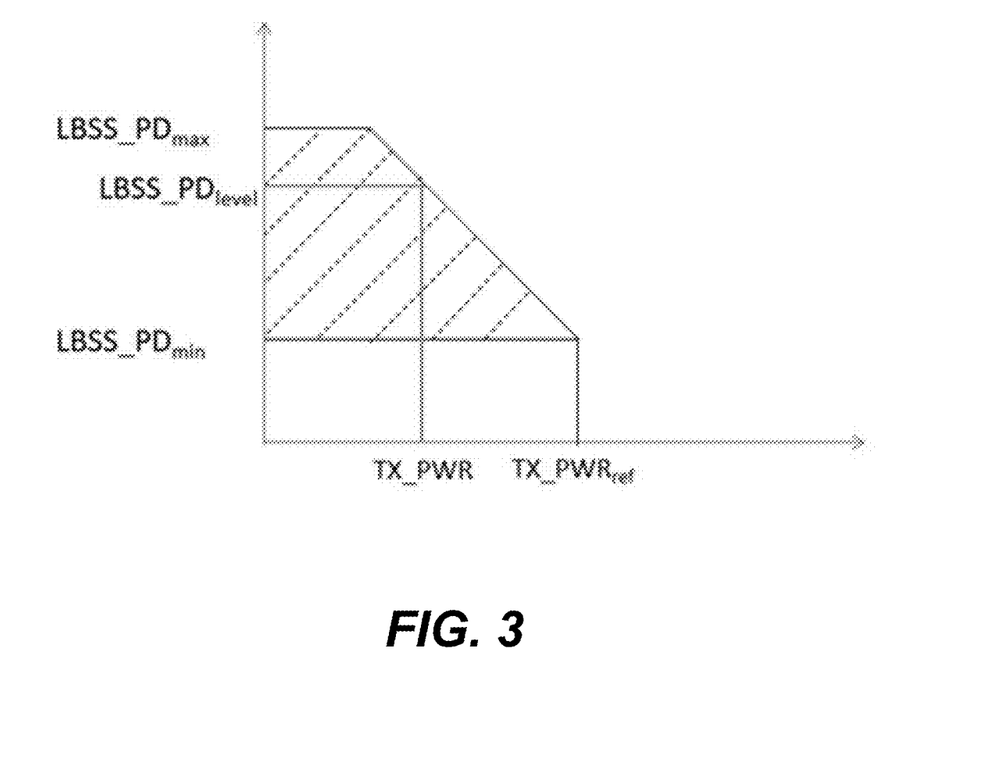
FIG. 3 illustrates example power constraints for a concurrent wireless transmission according to an embodiment.

FIG. 3 illustrates example power constraints for a concurrent wireless transmission according to an embodiment. In this example, a legacy (or first) wireless device transmission propagates into an overlapping region of a second wireless device using another wireless protocol, such as 802.11ax, for example. For purposes of illustration, AP2 102 in FIG. 1 serves as the legacy wireless device and AP1 101 in FIG. 1 serves as the second wireless device in the following example discussion. AP1 may detect the power level of the wireless transmission from AP2. If the detected power level of the wireless transmission from AP2 is below a threshold, then AP1 may perform a second wireless transmission during AP1's transmission. Various thresholds are shown on the y-axis in FIG. 3. Transmit power levels of AP1, TX_PWR, are shown on the x-axis and described in more detail below. Referring to FIG. 3, it can be seen that a threshold, LBSS_PDlevel, may be within a range (e.g., from LBSS_PDmax down to LBSS_PDmin). For example, in one instance, a threshold value may be set very low (e.g., at LBSS_PDmin), which indicates that a concurrent transmission by AP1 may occur when the detected transmission from AP2 is very low. Conversely, a threshold value may be set very high (e.g., at LBSS_PDmax), which indicates that a concurrent transmission by AP1 may occur when the detected transmission from AP2 is higher but below LBSS_PDmax. Advantageously, the threshold may be set across a range of values between the maximum and minimum. Accordingly, in one embodiment, LBSS_PDlevel may represent actual values of the threshold used by the 802.11ax AP (or STA) to decide if a transmission opportunity is available when a legacy AP/STA is transmitting on the same channel, where the thresholds may vary between a range defined by LBSS_PDmin and LBSS_PDmax, for example.

In one embodiment, the transmit power of AP1's second wireless transmission, TX_PWR, is constrained so that the transmission may be successful, yet not interfere with the legacy wireless transmission. Since concurrent transmission occurs when the detected transmission is below the threshold to avoid interference, the power level of the second wireless transmission may be set to a first value determined based on the threshold. For example, as illustrated in the diagram in FIG. 3, the transmit power of AP1 is constrained when the detected power level of AP2 meets the threshold (e.g., the power level is equal to or below the threshold), LBSS_PDlevel. When the threshold LBSS_PDlevel is at a minimum value, LBSS_PDmin, (e.g., and hence the detected power from AP2 is below LBSS_PDmin), then AP1 may transmit a maximum concurrent transmit power, TX_PWR=TX_PWRref. As the threshold LBSS_PDlevel increases, the allowable detected power from AP2 increases in strength, and AP1's transmit power, TX_PWR, is decreased so as not to interfere with AP2's transmission, for example. When LBSS_PDlevel is at a maximum value, LBSS_PDmax, AP1 may transmit concurrently at a minimum transmit power (e.g., TX_PWR is at a minimum). In some embodiments, in order to avoid interference with AP2's legacy wireless transmission, AP1 sets the transmit power such that the following inequality is satisfied:

$$LBSS\_PDlevel \ll \max(LBSS\_PDmin, \min(LBSS\_PDmax, LBSS\_PDmin+TX\_PWRref-TX\_PWR)).$$

In one embodiment, example values of TX_PWRref are defined in the IEEE802.11ax standard. LBSS_PDmin may be set to a predetermined value based on the legacy system configuration, for example. In one embodiment, LBSS_PDmin is −82 dBm, for example. One example value for TX_PWRref is a constant 21 dB for non-AP STAs or certain AP configurations, for example. TX_PWR may be expressed as a transmission power in dBm at the output of an antenna connector, for example.

From FIG. 3, one of ordinary skill in the art will recognize that AP1's transmit power may alternatively be expressed as follows, where the transmit power TX_PWR is a function of the threshold LBSS_PDlevel:

$$TX\_PWR=TX\_PWRref-(LBSS\_PDlevel-LBSS\_PDmin).$$

Figure 4:
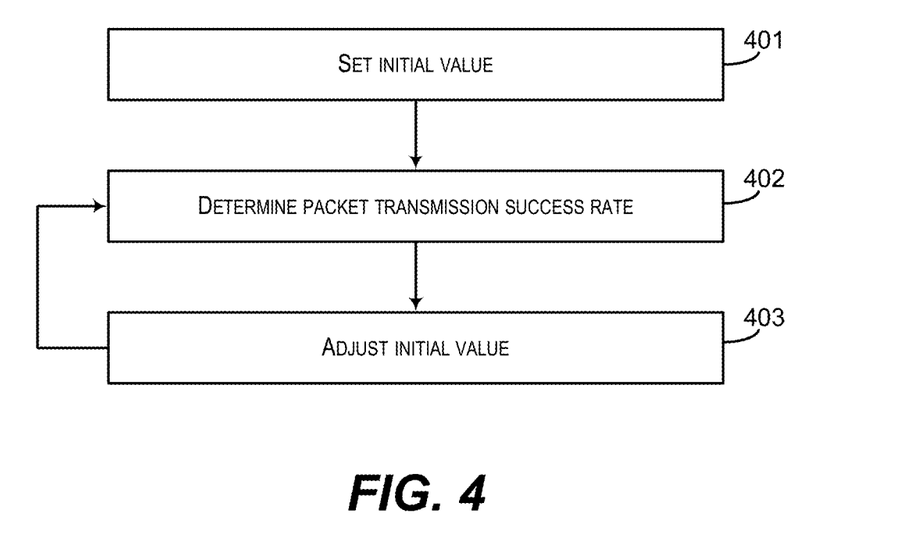
FIG. 4 illustrates threshold adjust according to an embodiment.

FIG. 4 illustrates threshold adjust according to an embodiment. In various embodiments, it may be advantageous to set the threshold to an initial value and the adjust the threshold to improve system performance. One technique is shown in FIG. 4. At 401, an initial value for the threshold is set. The initial value may be set to a predefined minimum value (e.g., LBSS_PDmin=−82 dBm) or to the predefined minimum value plus an offset (e.g., LBSS_PDmin+4 dBm=−78 dBm), for example. At 402, a packet transmission success rate is determined. Packet transmission success rates may be based on a number of concurrent transmissions on AP1 and optionally AP2, for example. For instance, AP1 can evaluate the success/failure rate of its concurrent transmissions. If a majority of these packets failed, then the $LBSS\_PD_{level}$ chosen by AP1 may be deemed to be too high. Conversely, if a majority of packets were successfully transmitted by AP1 and the packets in the concurrent transmission by AP2 during the concurrent transmission were also successful, for example, then the $LBSS\_PD_{level}$ chosen by AP1 may be deemed to be too low. Accordingly, at 403, the initial value of the threshold may be adjusted based on the transmission success rate. In some embodiments, the initial value is adjusted in predefined increments, which may be programmable, for example. For instance, adjustment down of the initial threshold level may be as follows:

LBSS_PDlevel=LBSS_PDlevel−delta_PD/2.

Adjustment up of the initial threshold level may be as follows:

LBSS_PDlevel=LBSS_PDlevel+delta_PD.

Delta_PD may be 1 dB and may be programmable to other values in some embodiments, for example. As mentioned above, the initial value may be initially set to the minimum threshold plus an offset as follows:

Initial Level=LBSS_PDmin(−82 dB)+delta_PD(e.g., delta_PD=1,2,3 dB)=−79 dB

Figure 5:
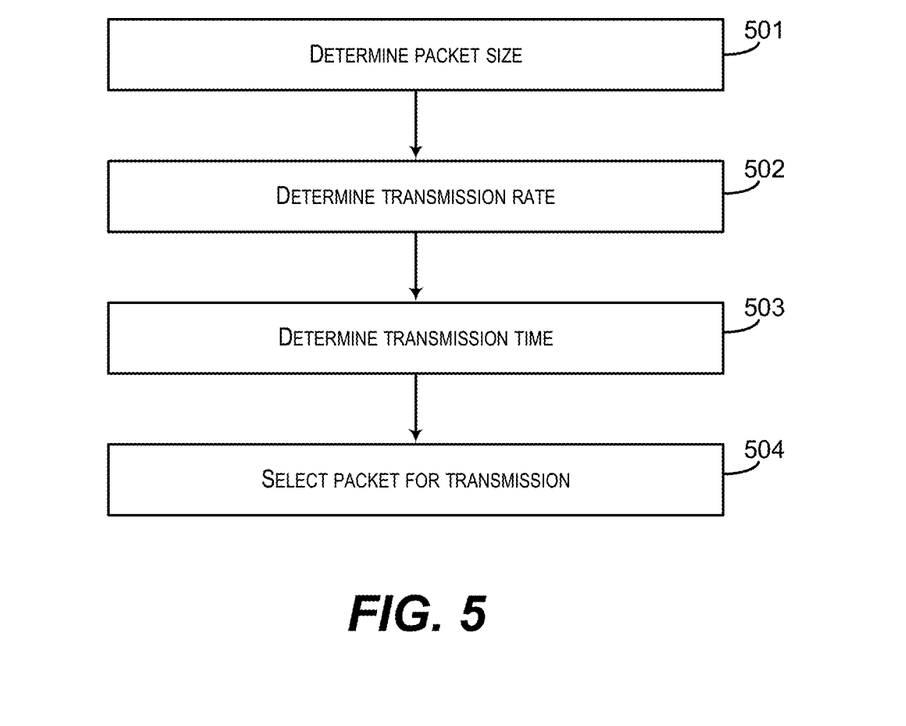
FIG. 5 illustrates packet selection and transmission according to an embodiment.

FIG. 5 illustrates packet selection and transmission according to an embodiment. Features and advantages of the present disclosure may improve the throughput of the network and/or reduce latency of packets, for example. In one embodiment, a wireless device performing a concurrent transmission, such as AP1, may analyze packets to be transmitted and selectively transmit packets during a concurrent transmission based on packet characteristics. For example, AP1 may detect a transmission by AP2 and determine a length of AP2's transmission. In some example embodiments, the packet transmitted by AP2 (e.g., a legacy AP) may include duration information in the header. AP1 receives AP2's transmission and may read the header field to find out the duration of AP2's transmission, for example. AP1 may analyze packets to be transmitted to determine if any of the packets may be transmitted concurrently during AP2's transmission.

For example, as illustrated in FIG. 5, at 501, a packet size may be determined for a plurality of packets to be transmitted at 501. At 502, transmission rates for the plurality of packets to be transmitted may be determined. For instance, if a packet's destination STA is closer, the transmission rate may be higher, and if the packets destination STA is further away, the transmission rate may be lower, for example. At 503, transmission times for the plurality of packets may be determined based on the packet sizes and transmission rates. At 504, packets may be selected for transmission based, at least in part, on the transmission times. For example, at least one packet may be selected from the plurality of packets to be transmitted, where the selected packet has a transmission time less than a remaining time for AP2's transmission. The selected packet may then be transmitted concurrently from AP1 during a wireless transmission of AP2, for example.

Figure 6:
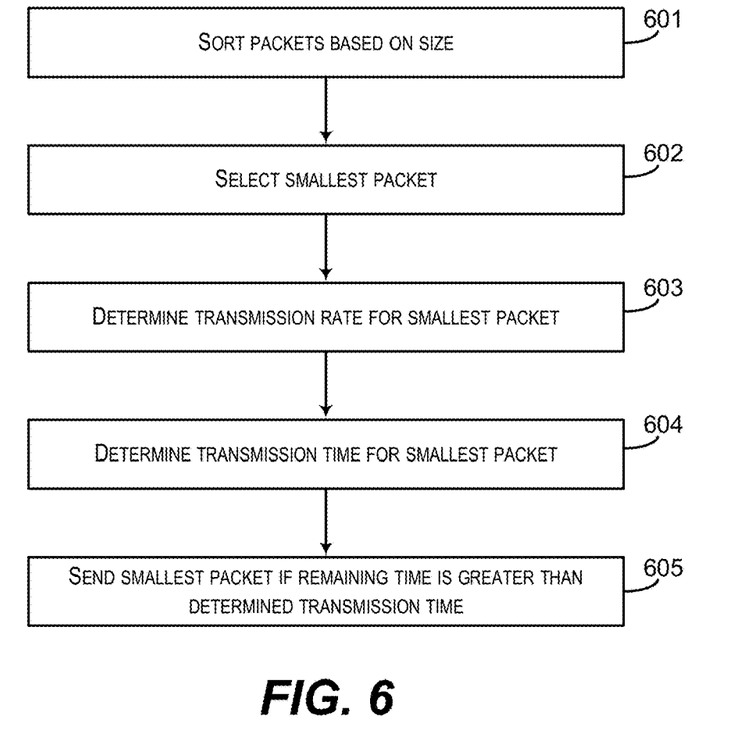
FIG. 6 illustrates packet selection and transmission according to another embodiment.

FIG. 6 illustrates packet selection and transmission according to another embodiment. In one embodiment, packets may be selected for transmission by AP1, for example, based on size and other factors so that the packets may be transmitted during a remaining time of AP2's transmission, for example. In this example, packets to be transmitted are sorted based on size at 601. At 602, a smallest packet is selected. At 603, a transmission rate for the smallest packet may be determined. At 604, a transmission time for the smallest packet is determined. Finally, at 605, the smallest packet may be sent on AP1's wireless transmission if the transmission time is less than a remaining time for the first wireless transmission.

Figure 7:
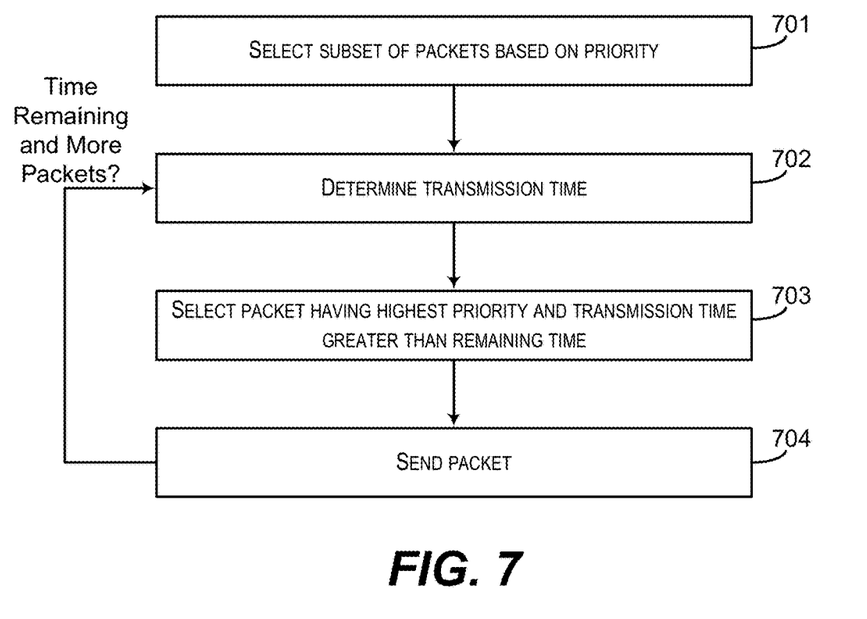
FIG. 7 illustrates packet selection and transmission according to yet another embodiment.

FIG. 7 illustrates packet selection and transmission according to yet another embodiment. This example illustrates that packets may be selected and transmitted concurrently based on priority of the packet relative to priorities of other packets. In some example embodiments, packets may be categorized into four (4) different priorities: voice, video, best effort, background traffic. For instance, at 701, a subset of packets from a plurality of packets to be transmitted are selected based on priority. The selected subset of packets may have a higher priority than unselected packets of the plurality of packets (e.g., video streaming packets). At 702, a transmission time for the subset of packets is determined. At 703, a first packet is selected from the subset of packets having a highest priority and a transmission time greater than a remaining time for AP2's wireless transmission. Accordingly, at 704, a highest priority packet that fits in the remaining time for AP2's transmission may be sent concurrently by AP1 to one of AP1 STAs, for example. If additional time is remaining for AP2s transmission and if there are more priority packets, steps 702, 703, and 704 may be repeated, for example.

EXAMPLE

Figure 8:
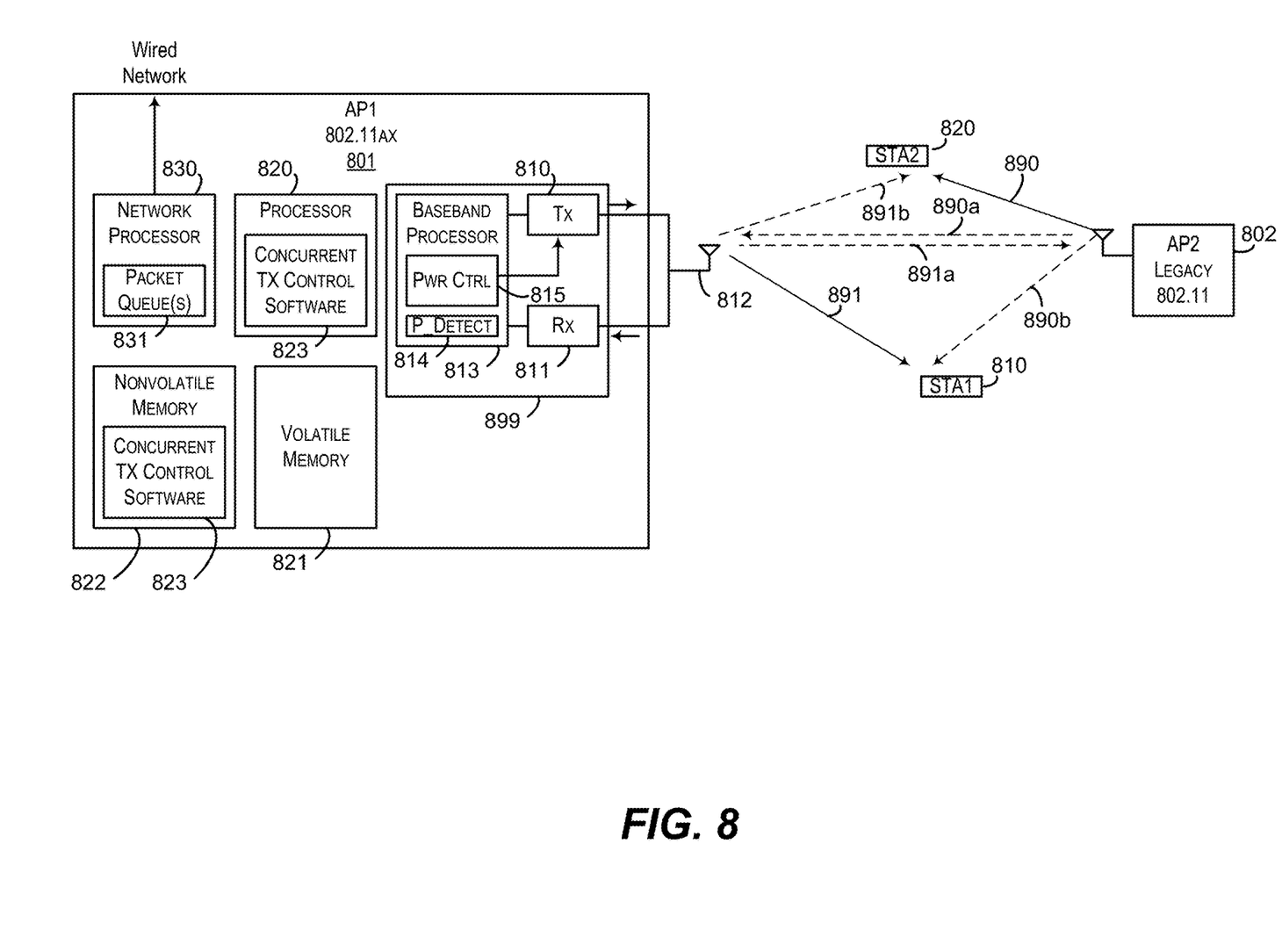
FIG. 8 illustrates an example wireless system according to an embodiment.

FIG. 8 illustrates an example wireless networking system according to an embodiment. In this example, AP1 801 may be configured to operate using an 802.11ax protocol and AP2 802 is configured to operate using a 802.11 legacy protocol, such as one or more of 802.11b/g/a/n/ac. AP1 and AP2 may be located nearby each other such that transmissions between AP1 and devices associated with AP1 (e.g., STA1 810) may propagate to, and interfere with, AP2 and devices associated with AP2 (e.g., STA 820). Similarly, transmissions between AP2 and devices associated with AP2 (e.g., STA2 820) may propagate to, and interfere with, AP1 and STA 810. In the present example, AP1 using 802.11ax may transmit on the same channel and at the same time as AP2's transmission using a legacy 802.11 protocol. This may be particularly advantageous for packets with low-latency requirements, which may be transmitted without waiting for the ongoing co-channel transmission to be completed.

AP1 801 allows wireless devices to connect to a wired network, such as the Internet. AP1 includes a wireless transceiver 899 comprising a wireless transmitter (Tx) 810, wireless receiver (Rx) 811, and baseband processor 813. Tx 810 and Rx 811 are coupled to one or more antennas 812 for sending and receiving wireless transmissions. Tx 810 and Rx 811 are coupled to baseband processor 813 for encoding and decoding digital information sent and received over the wireless channel, respectively. In some example embodiments, baseband processor 813 may include a power detector 814 and power controller 815. Power detector 814 may detect the transmission power of AP2's transmission, for example, which may be sent to processor 820 for use by software 823. Power controller 815 may configure the transmit power of Tx 810, for example, according to the techniques described herein. AP1 further includes a processor 820, volatile memory 821 (e.g., RAM), and non-volatile memory 822 (e.g., FLASH). Processor 820 may load concurrent transmission control program code 823 (i.e., software) from non-volatile memory 822. Concurrent transmission control program code 823 may be executed by processor 820 to configure AP1 to perform the techniques described herein, for example. Finally, AP1 includes a network processor 830 for sending and receiving digital information on AP1 (e.g., data received over a wireless link) to and from a wired network, for example. Network processor 830 may include one or more packet queues 831 for storing packets from the wired network that are to be transmitted wirelessly, for example.

As mentioned above, AP1 may perform a wireless transmission concurrently with AP2. For example, AP2 may be in the process of performing a wireless transmission 890 with STA2 820. Since AP1 and AP2 are located near each other, AP2's transmission 890 may be received by AP1 or one of AP1's associated STAs (e.g., STA 810) as illustrated at 890*a* and 890*b*. When AP1 detects a new transmission from AP2 (either directly or through an STA), AP1 may analyze the packet to determine if the received transmission is from a legacy device operating on a different protocol. For example, AP1 may check the receive address (RA), transmit address (TA), and Basic Service Set Identification (BSSID) fields of a frame received by AP1 from AP2. In one example embodiment, if none of the address fields match the BSSID of AP1 and the packet being transmitted is a 11b/g/a/n/ac frame and the packet is not a control/management frame, then AP1 classifies the received packet as a Legacy Basic Service Set (LBSS) transmission, which was not intended for processing by AP1.

Next, AP1 may determine the feasibility of simultaneous transmission. When AP1 detects an LBSS transmission between AP2 and one of its associated clients (STA 820) and the received signal power detected by AP1 (or STA1) is below a threshold LBSS_PDlevel, AP1 can initiate a concurrent transmission 891 to its own clients, e.g. STA1 in FIG. 8. However, AP1 may be required to complete the concurrent transmission within the same time period as the ongoing AP2 transmission to take advantage of the parallel transmission opportunity and then free the channel after AP2's transmission is completed. Further, in order to minimize interference (as illustrated at 891*a* and 891*b* in FIG. 8) caused by transmission 891 with the ongoing transmission 890 from AP2, AP1 may be required reduce the transmit power for the packet to be transmitted by AP1. The transmit power may be set according to the techniques describe above with respect to FIG. 3, for example.

Figure 9:
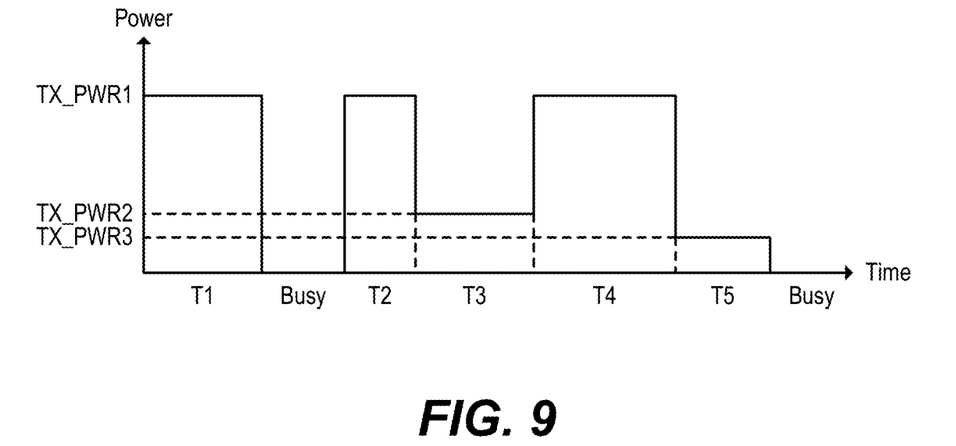
FIG. 9 illustrates transmit power of a wireless transmitter according to an embodiment.

FIG. 9 illustrates transmit power of AP1 801 over a plurality of transmissions. A first transmission, T1, of AP1 may not be a concurrent transmission, and transmission T1 may be carried out at a first power level TX_PWR1. During a time period after T1, the channel may be busy (e.g., a received signal power from another device transmission may be above the threshold). A subsequent transmission T2 may similarly be carried out at TX_PWR1, for example, but AP1 may reduce its transmit power to TX_PWR2 to perform transmission T3 concurrently with a transmission from another AP. Transmission T4 may be carried out non-concurrently, and AP1 may again reduce its transmit power to TX_PWR3 to perform transmission T5 concurrently. In this example, AP1 may have increased the threshold used between T3 and T5, for example, and thus the transmit power used for concurrent transmission was reduced.

Referring again to FIG. 8, once AP1 is ready to perform a concurrent transmission, AP1 may select packets from queue 831 for transmission. In one example embodiment, each packet in the AP1's transmit queue may be tagged with a QoS priority level, p, where p takes values from 1 to P, with P indicating highest priority. AP1 may sort the queued packets based on QoS priority and select all the packets which have the highest priority level, for example. AP1 may place such packets in a second queue and then sort these high priority packets based on packet length. AP1 may selects a packet which is of smallest size, for example. Next, AP1 may determine the time required to send the packet.

The time to transmit a packet may be dependent on two factors: packet size and the data rate. If packet size is N bits and data rate is R bit/second, then the time taken to transmit the packet is N/R seconds. The data rate is typically a function of link quality, i.e. the Signal-to-Noise Ratio (SNR) between transmitter and receiver. At high SNR, the transmitter can use high data rates because the probability of correct reception is high. As SNR decreases, the data rate will also reduce. If the receiver is far away from the transmitter, the SNR will be low (due to propagation loss). If the noise level is high (e.g. due to interfering transmissions on same frequency), then SNR will also be low.

Accordingly, packet size and data rate may be used to find the total transmission time of the packet. In one example embodiment, if this time is less than the time still remaining for the ongoing LBSS transmission, AP1 initiates transmission of the selected packet. Next, AP1 picks the next packet from the high priority queue. If the queue is exhausted without finding a packet that can be transmitted, and if there is still time left for AP2's transmission to finish, AP1 selects packets with the next lowest priority and repeats the process unless a suitable packet is found or AP2's transmission is finished.

As a final step, once a packet is selected and transmitted by AP1 to STA1, STA1 may sent an acknowledgement (ACK) to AP1 indicating that the packet was successfully received, for example. If there's still time left for AP2's transmission to finish, AP1 may decide to send another packet provided the new transmission for the next packet fits within the remaining time window. Conversely, if the packet transmitted by AP1 is not successfully received by STA1, AP1 may decide to re-send the packet provided the retransmission fits within the remaining time window. Alternatively, AP1 may wait till the ongoing transmission from AP2 is completed before retransmitting to ensure successful delivery.

FURTHER EXAMPLE EMBODIMENTS

In various embodiments, features of the present disclosure may be embodied in methods, devices, or as code stored on a computer readable medium such as volatile or non-volatile memory, including, but not limited to, solid state memory, a disk drive, or various forms of random access memory (RAM), for example.

In one embodiment, the present disclosure includes a wireless transmission method comprising determining, on a first wireless device, that a first wireless transmission using a first protocol between a plurality of wireless devices is not intended for processing by the first wireless device, determining, on the first wireless device, if a first power level of the first wireless transmission is equal to or below a threshold, and performing, on the first wireless device, a second wireless transmission using a second protocol between the first wireless device and at least a second wireless device during the first wireless transmission when the first power level is equal to or below the threshold, wherein a second power level of the second wireless transmission is set to a first value determined based on the threshold.

In another embodiment, the present disclosure includes a wireless device comprising a processor and a wireless transceiver. The processor is configured to determine that a first wireless transmission using a first protocol between a plurality of wireless devices is not intended for processing by the wireless device and determine if a first power level of the first wireless transmission is equal to or below a threshold. The wireless transceiver is coupled to the processor, the wireless transceiver configured to transmit or receive the digital information, wherein the wireless transceiver is further configured to perform a second wireless transmission using a second protocol between the first wireless device and at least a second wireless device during the first wireless transmission when the first power level is equal to or below the threshold, wherein a second power level of the second wireless transmission is set to a first value determined based on the threshold.

In another embodiment, the present disclosure includes a non-transitory computer readable storage medium having stored thereon program code executable by a processor on a first network device, the program code comprising code that causes the first network device to determine that a first wireless transmission using a first protocol between a plurality of wireless devices is not intended for processing by the first wireless device, code that causes the first network device to determine if a first power level of the first wireless transmission is equal to or below a threshold, and code that causes the first network device to perform a second wireless transmission using a second protocol between the first wireless device and at least a second wireless device during the first wireless transmission when the first power level is equal to or below the threshold, wherein a second power level of the second wireless transmission is set to a first value determined based on the threshold.

One or more of the following features may be further embodied in the present disclosure alone or in any combination.

In one embodiment, the second power level is set so that the second wireless transmission is performed without interfering with the first wireless transmission.

In one embodiment, a method, device, or code may determine, on the first wireless device, a time remaining for the first wireless transmission, wherein the second wireless transmission is configured to be completed within the time remaining for the first wireless transmission.

In one embodiment, the second protocol is an 802.11ax protocol transmission and the first protocol is an 802.11 legacy protocol transmission.

In one embodiment, said determining that the first wireless transmission using a first protocol between a plurality of wireless devices is not intended for processing by the first wireless device comprises determining if a packet in the first wireless transmission is not included in a basic service set (BSS) of the first wireless device, wherein if the packet is not included in the BSS of the first wireless device, then the first wireless transmission is classified as a legacy transmission.

In one embodiment, said determining that the first wireless transmission using a first protocol between a plurality of wireless devices is not intended for processing by the first wireless device further comprises matching a receive address and a transmit address to a BSS identification (BSSID).

In one embodiment, a method, device, or code may determine packet sizes of a plurality of packets to be transmitted, determine transmission rates for the plurality of packets to be transmitted, determine transmission times for the plurality of packets based on the packet sizes and transmission rates, and select, based on the transmission times, at least one packet from the plurality of packets to be transmitted, wherein the selected at least one packet is fully transmitted during the second wireless transmission.

In one embodiment, a method, device, or code may sort a plurality of packets to be transmitted based on packet size, select a smallest packet, determine a transmission rate for the smallest packet, determine a transmission time for the smallest packet, and send the smallest packet on the second wireless transmission if the transmission time is less than a remaining time for the first wireless transmission.

In one embodiment, a method, device, or code may select a subset of packets from a plurality of packets to be transmitted based on priority, the selected subset of packets having a higher priority than unselected packets of the plurality of packets, determine a transmission time for the subset of packets, select a first packet from the subset of packets having a highest priority and a transmission time greater than a remaining time for the first wireless transmission, and send the first packet on the second wireless transmission.

In one embodiment, the threshold is programmable across a range between a minimum value and a maximum value.

In one embodiment, a method, device, or code may set an initial value for the threshold, determine a packet transmission success rate for at least for the first wireless device, and adjust the initial value based on the packet transmission success rate.

In one embodiment, the initial value is set to a predefined minimum value.

In one embodiment, the initial value is set to a predefined minimum value plus an offset.

In one embodiment, the initial value is adjusted in programmable increments.

In one embodiment, a method, device, or code may receive a packet transmission success rate for the second wireless device, wherein the initial value is increased when the packet transmission success rate of the first wireless device is above a first packet transmission success rate threshold and the second wireless device is above a second packet transmission success rate threshold during a concurrent transmission.

In one embodiment, the initial value is decreased when the packet transmission success rate is equal to or below a packet transmission success rate threshold.

In one embodiment, a method, device, or code may perform, on the first wireless device, a third wireless transmission using the second protocol when first wireless transmission has been completed, wherein a third power level of the third wireless transmission is set to a second value greater than the first value and greater than a maximum concurrent transmission power level.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A wireless transmission method comprising:
   determining, on a first wireless device, that a first wireless transmission using a first protocol between a plurality of wireless devices is not intended for processing by the first wireless device;
   determining, on the first wireless device, if a first power level of the first wireless transmission is equal to or below a threshold; and
   performing, on the first wireless device, a second wireless transmission using a second protocol between the first wireless device and at least a second wireless device during the first wireless transmission when the first power level is equal to or below the threshold,
   wherein a second power level of the second wireless transmission is set to a first value determined based on the threshold.

2. The method of claim 1 wherein the second power level is set so that the second wireless transmission is performed without interfering with the first wireless transmission.

3. The method of claim 1 further comprising determining, on the first wireless device, a time remaining for the first wireless transmission, wherein the second wireless transmission is configured to be completed within the time remaining for the first wireless transmission.

4. The method of claim 1 wherein the second protocol is an 802.11ax protocol transmission and the first protocol is an 802.11 legacy protocol transmission.

5. The method of claim 1 wherein said determining that the first wireless transmission using a first protocol between a plurality of wireless devices is not intended for processing by the first wireless device comprises determining if a packet in the first wireless transmission is not included in a basic service set (BSS) of the first wireless device, wherein if the packet is not included in the BSS of the first wireless device, then the first wireless transmission is classified as a legacy transmission.

6. The method of claim 5 wherein said determining that the first wireless transmission using a first protocol between a plurality of wireless devices is not intended for processing by the first wireless device further comprises matching a receive address and a transmit address to a BSS identification (BSSID).

7. The method of claim 1 further comprising:
   determining packet sizes of a plurality of packets to be transmitted;
   determining transmission rates for the plurality of packets to be transmitted;
   determining transmission times for the plurality of packets based on the packet sizes and transmission rates; and
   selecting, based on the transmission times, at least one packet from the plurality of packets to be transmitted, wherein the selected at least one packet is fully transmitted during the second wireless transmission.

8. The method of claim 1 further comprising:
   sorting a plurality of packets to be transmitted based on packet size;
   selecting a smallest packet;
   determining a transmission rate for the smallest packet;
   determining a transmission time for the smallest packet; and
   sending the smallest packet on the second wireless transmission if the transmission time is less than a remaining time for the first wireless transmission.

9. The method of claim 1 further comprising:
   selecting a subset of packets from a plurality of packets to be transmitted based on priority, the selected subset of packets having a higher priority than unselected packets of the plurality of packets;
   determining a transmission time for the subset of packets;
   selecting a first packet from the subset of packets having a highest priority and a transmission time greater than a remaining time for the first wireless transmission; and
   sending the first packet on the second wireless transmission.

10. The method of claim 1 wherein the threshold is programmable across a range between a minimum value and a maximum value.

11. The method of claim 1 further comprising:
    setting an initial value for the threshold;
    determining a packet transmission success rate for at least for the first wireless device; and
    adjusting the initial value based on the packet transmission success rate.

12. The method of claim 11 wherein the initial value is set to a predefined minimum value.

13. The method of claim 11 wherein the initial value is set to a predefined minimum value plus an offset.

14. The method of claim 11 wherein the initial value is adjusted in programmable increments.

15. The method of claim 11 further comprising receiving a packet transmission success rate for the second wireless device, wherein the initial value is increased when the packet transmission success rate of the first wireless device is above a first packet transmission success rate threshold and the second wireless device is above a second packet transmission success rate threshold during a concurrent transmission.

16. The method of claim 11 wherein the initial value is decreased when the packet transmission success rate is equal to or below a packet transmission success rate threshold.

17. The method of claim 1 further comprising performing, on the first wireless device, a third wireless transmission using the second protocol when first wireless transmission has been completed, wherein a third power level of the third wireless transmission is set to a second value greater than the first value and greater than a maximum concurrent transmission power level.

18. A non-transitory computer readable storage medium having stored thereon program code executable by a processor on a first network device, the program code comprising:
    code that causes the first network device to determine that a first wireless transmission using a first protocol between a plurality of wireless devices is not intended for processing by the first wireless device;
    code that causes the first network device to determine if a first power level of the first wireless transmission is equal to or below a threshold; and
    code that causes the first network device to perform a second wireless transmission using a second protocol between the first wireless device and at least a second wireless device during the first wireless transmission when the first power level is equal to or below the threshold,
    wherein a second power level of the second wireless transmission is set to a first value determined based on the threshold.

19. A wireless device comprising:

a processor is configured to:
- determine that a first wireless transmission using a first protocol between a plurality of wireless devices is not intended for processing by the wireless device, and
- determine if a first power level of the first wireless transmission is equal to or below a threshold; and a wireless transceiver coupled to the processor, the wireless transceiver configured to transmit or receive the digital information,
- wherein the wireless transceiver is further configured to perform a second wireless transmission using a second protocol between the first wireless device and at least a second wireless device during the first wireless transmission when the first power level is equal to or below the threshold,
- wherein a second power level of the second wireless transmission is set to a first value determined based on the threshold.

\* \* \* \* \*